United States Patent [19]

Orgun et al.

[11] Patent Number: 5,096,146
[45] Date of Patent: Mar. 17, 1992

[54] APPARATUS AND METHODS FOR CONTROLLING COMMANDED OPERATION OF AN AIRCRAFT WITHIN A PREDETERMINED FLIGHT PARAMETER LIMIT

[75] Inventors: Munir Orgun, Woodinville; Dung D. Nguyen, Edmonds, both of Wash.

[73] Assignee: The Boeing Company, Seattle, Wash.

[21] Appl. No.: 570,108

[22] Filed: Aug. 17, 1990

[51] Int. Cl.$^5$ .............................................. G05D 1/10
[52] U.S. Cl. ................................. 244/179; 244/76 B; 364/434
[58] Field of Search ............... 244/179, 76 B, 76 R, 244/194, 195; 318/585, 580; 364/434, 433, 439

[56] References Cited

U.S. PATENT DOCUMENTS

| | | | |
|---|---|---|---|
| 3,362,661 | 1/1968 | Booth et al. | 244/179 X |
| 3,550,884 | 12/1970 | Moeller | 244/179 |
| 3,627,236 | 12/1971 | Hess | 244/182 X |
| 3,807,666 | 4/1974 | Derlin | 244/179 X |
| 3,809,867 | 5/1974 | Hattendorf | 244/179 X |
| 3,837,603 | 9/1974 | Schultz et al. | 244/77 A |
| 4,129,275 | 12/1978 | Gerstine et al. | 244/181 |
| 4,488,235 | 12/1984 | Miller | 364/434 |
| 4,553,210 | 11/1985 | Centala | 364/434 |
| 4,590,567 | 5/1986 | Hofmann et al. | 364/434 |
| 4,764,872 | 8/1988 | Miller | 364/434 X |
| 4,797,674 | 1/1989 | Zweifel et al. | 340/968 |

Primary Examiner—Sherman Basinger
Assistant Examiner—Christopher P. Ellis
Attorney, Agent, or Firm—R. H. Sproule; B. A. Donahue

[57] ABSTRACT

A controller for generating a bank angle limit for an aircraft during takeoff with a nonoperational engine. The controller operates so that there are minimum and maximum bank angle limits. Between these minimum and maximums, there is a linear relationship between aircraft airspeed and bank angle limit. However, before there is a change in aircraft airspeed from an increasing mode to a decreasing mode or vice versa, the bank angle limit remains constant until the change in aircraft airspeed is greater than or equal to a predetermined airspeed differential.

15 Claims, 4 Drawing Sheets

APPARATUS AND METHODS FOR CONTROLLING COMMANDED OPERATION OF AN AIRCRAFT WITHIN A PREDETERMINED FLIGHT PARAMETER LIMIT

TECHNICAL FIELD

The present invention pertains to apparatus and methods for automatically controlling commanded operation of an aircraft within a predetermined flight parameter limit, such as a bank angle limit, during certain flight situations.

BACKGROUND OF THE INVENTION

During flight operations a number of restrictions are typically placed on aircraft operation. For example, there may be restrictions relating to minimum and maximum aircraft airspeeds and aircraft g-loading. Futhermore, it may be desirable to limit aircraft bank angle commanded by the pilot or autopilot during an engine-out takeoff. This is to reduce aircraft drag and prevent accidental stalling. Typically, this information is available from the aircraft's flight manual and is memorized by the pilot.

It may be desirable, however, to automatically limit aircraft operation commanded by the pilot in accordance with these flight restrictions. Conventionally, some aircraft have used computer controlled systems to limit maximum bank angle during an engine-out takeoff until a predetermined airspeed has been reached. Upon reaching this threshold airspeed, the maximum permissible bank angle was increased. In the event the airspeed decreased below this threshold, the maximum bank angle remained at the upper limit.

Conventionally, a number of aircraft automatic control systems have been disclosed. For example, U.S. Pat. No. 3,837,603 by Schultz et al discloses an automatic flight control system for controlling the aircraft so as to maintain runway centerline alignment during takeoff, landing, and go-around when an outboard engine is not functioning. In addition, in U.S. Pat. No. 4,129,275 by Gerstine et al there is disclosed automatic flight control apparatus for aircraft which includes a hysteresis function for generating a bias signal when an airspeed delta exceeds a predetermined limit.

SUMMARY OF THE INVENTION

The present invention pertains to a method for controlling commanded operation of an aircraft within a predetermined flight parameter limit. In an exemplary embodiment, the flight parameter limit is a bank angle limit. The method includes the steps of receiving a flight control command, typically generated by the pilot, autopilot or an onboard computer, for controlling a flight parameter of the aircraft. In addition, the aircraft airspeed is also obtained. The method further includes the step of calculating a limit to the control command as a function of the aircraft airspeed such that when the airspeed has been increasing and then decreases or when the airspeed has been decreasing and then increases, the flight parameter limit remains constant until the aircraft airspeed has changed a predetermined amount. Furthermore, the method includes the step of using the calculated flight parameter limit to limit the flight control command so that the aircraft does not exceed the flight parameter limit.

BRIEF DESCRIPTION OF THE DRAWINGS

The present invention will be described in further detail in the following detailed description in reference to the attached drawings, in which.

DETAILED DESCRIPTION

The present invention pertains to a controller for setting a maximum commanded flight attitude limit of an aircraft. In an exemplary embodiment, the present invention pertains to a controller for setting a maximum aircraft bank angle commanded by the pilot or autopilot during a takeoff engine-out condition. However, before proceeding with a discussion of the present invention, a brief discussion of conventional controllers for controlling a maximum commanded bank angle limit of an aircraft will be provided.

Figure 1:
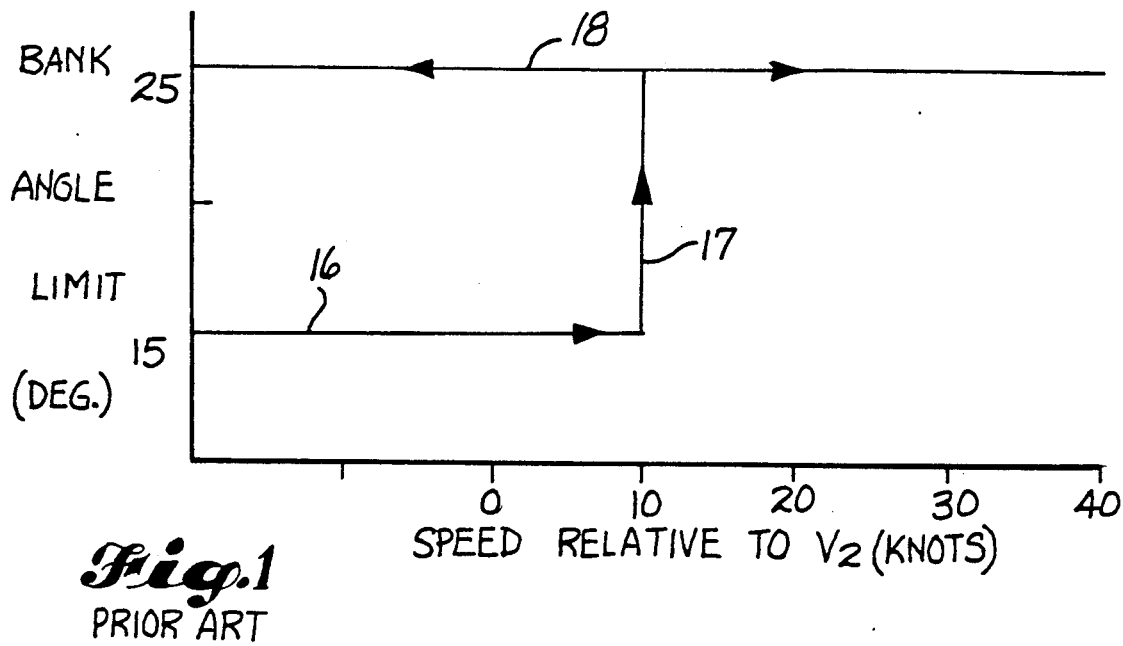
FIG. 1 is a graph of bank angle limit as a function of aircraft airspeed relative to V2 for a conventional bank angle controller.

Referring first to FIG. 1, there is a graph showing the operation of the conventional controller for controlling maximum commanded bank angle during an engine-out takeoff. As shown in FIG. 1, for airspeeds up to V2 (climb out airspeed) plus ten knots, the bank angle limit is fifteen degrees as shown by the line identified by the number 16. Then for speeds equal to or greater than V2+10, the bank angle limit is increased to twenty five degrees as shown by the line 18. A bank angle limit of twenty five degrees is maintained once V2+10 is reached even if the airspeed drops below V2+10 as shown by the line 17. This is to avoid large changes in bank angle limit for small changes in airspeed above and below V2+10.

Figure 2:
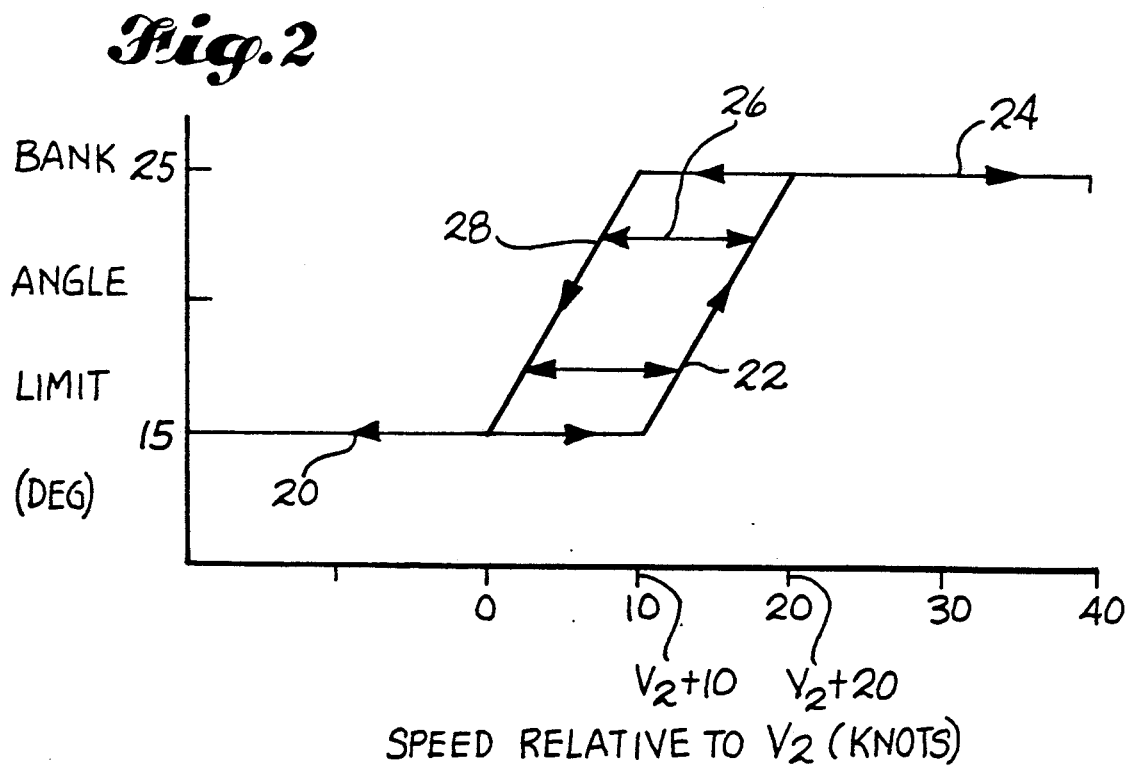
FIG. 2 is a graph of bank angle limit as a function of aircraft airspeed relative to V2 for the controller of the present invention.

In the present invention there is provided a controller (to be described in greater detail later) which operates in the manner described graphically in FIG. 2. More specifically, the present invention uses a unique hysteresis function to adjust the maximum commanded aircraft, bank angle limit as a function of aircraft airspeed. As shown in FIG. 2, when the aircraft reaches airspeeds up to and including V2+10, the bank angle limit is fifteen degrees as defined by a line identified by the number 20. However, when V2+10 is exceeded, the bank angle limit increases in a linear manner as a function of increasing airspeed along a line 22. This occurs until a bank angle limit of twenty five degrees is reached at V2+20. During further increases in aircraft airspeed, the bank angle limit remains a constant twenty five degrees as shown by the line 24 in FIG. 2. In the event aircraft airspeed, which initially is between V2+10 and V2+20 (line 22), decreases by a margin less than ten knots, then the bank angle limit remains the same as illustrated by lines 26. However, if aircraft airspeed decreases by a margin of ten knots or more when the aircraft airspeed has been increasing between V2+10 and V2+20, then the bank angle limit decreases along a line 28 which is parallel to the line 22 and which is spaced apart from line 22 by a margin of ten knots.

It should be noted that lines 20, 24, and 26 are bi-directional. That is, for increases or decreases in airspeed, movement along these lines in either direction mandate a constant bank angle limit. However, lines 22 and 28 are uni-directional. That is, movement along line 22 is only in the upward direction. Therefore as long as airspeed is increasing, there is upward movement along line 22 mandating an increase in bank angle limit. In the event there is then a decrease in aircraft airspeed, there is leftward horizontal movement along the line 26 which corresponds to the bank angle limit reached when the aircraft airspeed began decreasing.

As mentioned previously, line 28 (FIG. 2) is also uni-directional but in the downward direction. That is, when there has been a decrease in airspeed of ten knots or more (when the airspeed was initially between V2+10 and V2+20), then as long as airspeed continues to decrease, there is downward movement along line 28 mandating a decrease in bank angle limit. However, in the event of an increase in aircraft airspeed, then movement is in the rightward horizontal direction along a line 26 which corresponds to the bank angle limit existing when the airspeed began increasing.

In this manner, there are no large changes in bank angle limit for small changes in aircraft airspeed above and below V2+10 as with some conventional bank angle limit controllers. Furthermore, there is downward and upward linear adjustment of the bank angle limit as a function of the aircraft airspeed.

Figure 3:
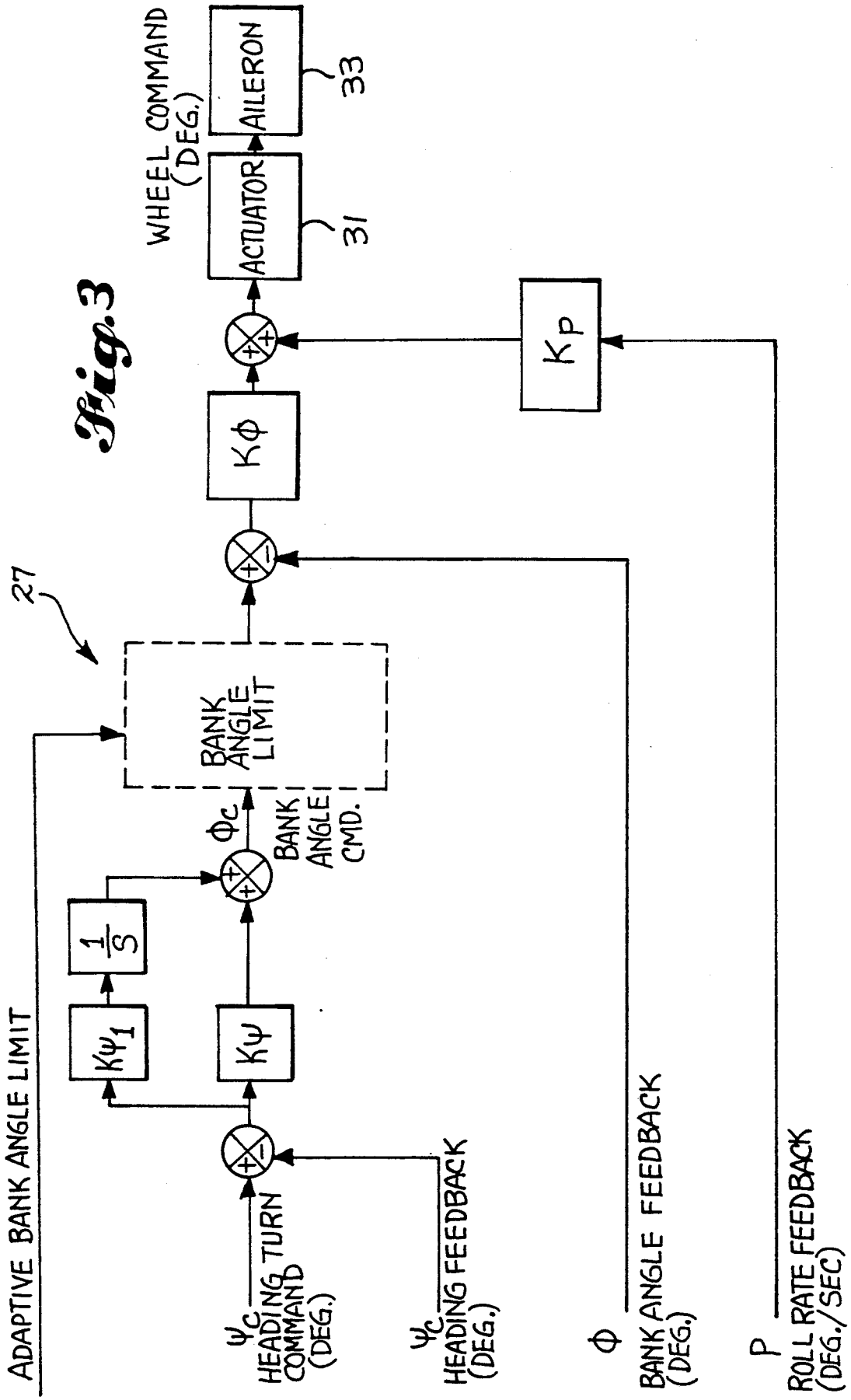
FIG. 3 is a conventional bank angle control algorithm which is limited by the output of the bank angle control law of the present invention.

In an exemplary embodiment, the present invention is implemented by a software program stored in the aircraft flight control computer, such as the Flight Control Computer currently onboard Boeing 747-400 aircraft. The bank angle limit value from the bank angle limit control law of the present invention is stored in Read Only Memory of the Flight Control Computer. This value is used to limit a bank angle command generated from a conventional heading and track control law also located inside the Flight Control Computer and shown in greater detail in FIG. 3. In the present invention, the unique bank angle limit value is used to limit the conventional bank angle command value to..control aircraft bank angle limit. The output from the Flight Control Computer 27 is a wheel command which is fed to a conventional aileron actuator 31 which in turn drives a conventional aircraft aileron 33.

Figure 4A:
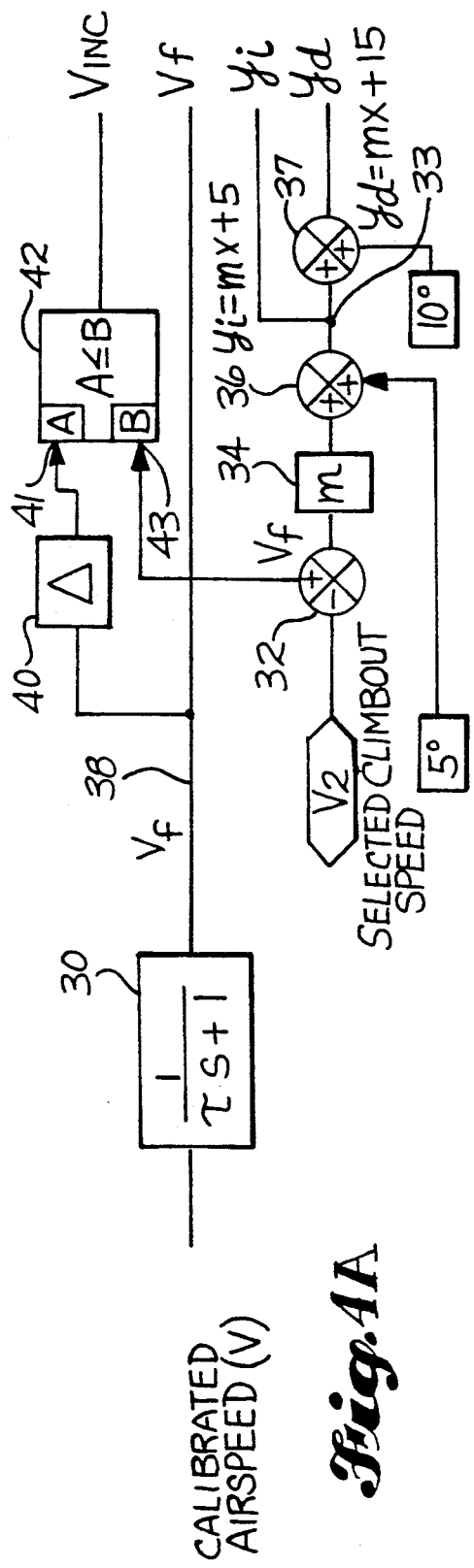
FIGS. 4A and 4B are simplified flow diagrams illustrating operation of the controller of the present invention.

In the present embodiment, the software program is set forth in the diagram shown in FIG. 4A wherein aircraft calibrated airspeed V is retrieved from the aircraft Air Data Computer such as the one currently on board Boeing 747-400 aircraft. This value is fed through a conventional two second lag filter 30 to remove noise caused by turbulence so as to generate an output $V_f$.

In order to generate the X-axis values for the graph in FIG. 2 (aircraft airspeed relative to V2), the value for V2 is retrieved from the aircraft Mode Control Panel (on Boeing 747-400 aircraft) where it has been entered, and it is subtracted from $V_f$ at the subtractor 32 (FIG. 4A). In the present invention, lines 22, 28 are straight lines having the formula $y = mx + b$ (FIG. 2). In order to generate the line 22, the x-axis value ($V_f - V2$) is multiplied by a predetermined slope constant m at block 34 (FIG. 4A), and the y-intercept value (a constant of five degrees) is added to this product at adder 36 to generate the equation for line 22 ($y_i = mx + 5$). On the other hand, in order to generate the line 28, a constant of ten degrees is added to the equation $y = mx + 5$ at adder 37 to generate the equation $y_d = mx + 15$.

In order to determine whether the aircraft airspeed is increasing or decreasing, the value $V_f$ output from filter 30 is fed via a junction 38 through a delay circuit 40 to an input 41 of a comparator 42. The other input 43 to the comparator 42 is a non-delayed output $V_f$ from the filter 30 via the junction 38. When the value of the delayed value to input 41 is less than or equal to the non-delayed value to the input 43, an output signal $V_{inc}$ goes high thereby indicating the aircraft airspeed is increasing.

Figure 4B:
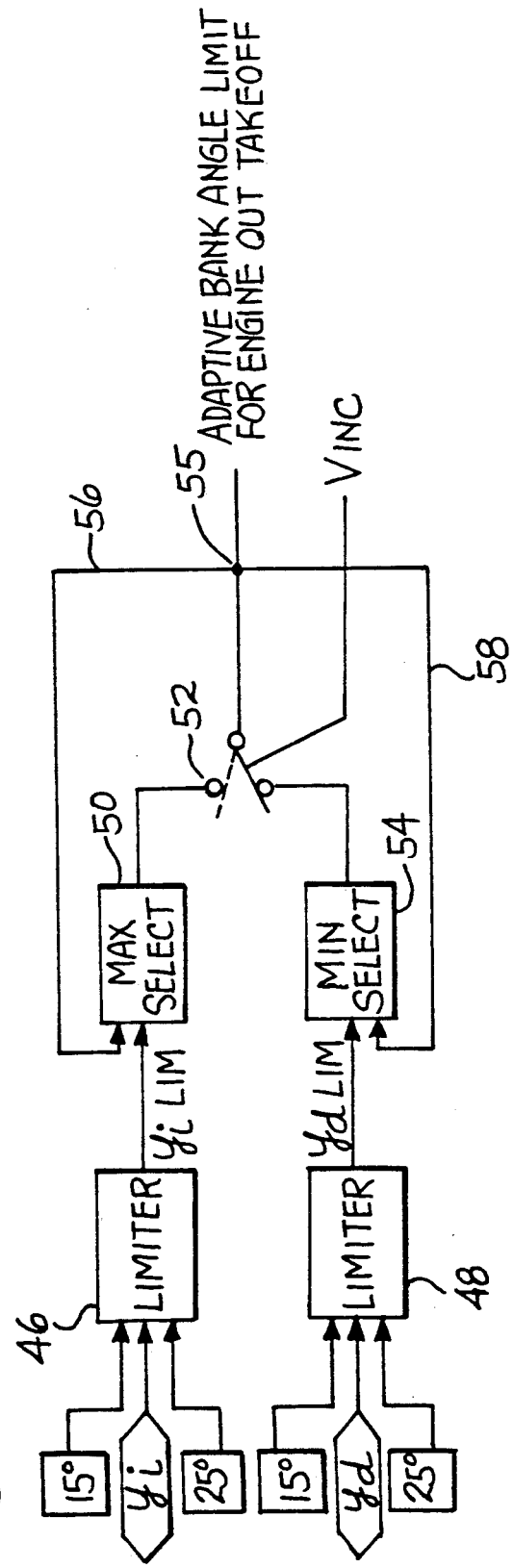

In order to generate the bank angle limit value, the outputs $y_i$ and $y_d$ are fed to respective value limiters 46, 48 shown in FIG. 4B. If the value of $y_i$ or $y_d$ is greater than twenty five degrees, then its value is limited to twenty five degrees in the form of an output ylim. On the other hand, if the value of $y_i$ or $y_d$ is less than fifteen degrees, then its value is limited to fifteen degrees. Continuing downstream, the limited value $y_i$lim is output to a maximum select block 50 (to be described shortly) and then to a switch 52. Similarly, the limited value $y_d$lim is output from the limiter 48 where it is fed downstream through a minimum select block 54 (also to be described shortly) to the switch 52.

In the present invention, the switch 52 is operated by the output $V_{inc}$ from the comparator 42. In this manner, when the aircraft airspeed is increasing, the switch 52 is placed in the dotted line position shown in FIG. 4B so that the value generated from Max Select block 50 is output as the bank angle limit. In this manner operation along the line 22 (FIG. 2) is selected. On the other hand, if the output from comparator 42 is low, switch 52 is placed in the solid line position shown in FIG. 4B. In this manner operation along line 28 is selected to generate the bank angle limit value.

As discussed previously, operation along lines 22, 28 are uni-directional. This is accomplished by the Max Select block 50 (FIG. 4B) and the Min Select block 54. More specifically, the output from switch 52 (bank angle limit) is fed back via a junction 55 (i) to a second input of Max Select block 50 along a feedback loop 56, and (ii) to a second input of Min Select block 54 along a feedback loop 58. Block 50 operates such that the higher of the two inputs to block 50 ($y_i$lim or the feedback value) is output to switch 52. On the other hand, block 54 operates such that the lower of the two inputs to block 54 ($y_d$lim or the feedback value) is output to the switch 52.

In operation, it can be seen that if aircraft airspeed is increasing, for example, then the output $V_{inc}$ from comparator 42 will be high. Since $V_{inc}$ is high, switch 52 is placed in the dotted line position and the output from Max Select block 50 is fed to junction 52. In the event aircraft airspeed begins to decrease, for example, then $V_{inc}$ goes low. This causes the switch 52 to be moved to the solid line position so that the output from Min Select block 54 is fed to the junction 52.

In the present invention, the Min Select function ensures that the bank angle limit shall remain constant until the airspeed decreases by at least ten knots. That is, in the event airspeed (between V2+10 and V2+20) changes from an increasing mode to a decreasing mode, the calculated value $y_d$ will initially be greater than the feedback value to the Max Select block 50. Therefore, until the airspeed decreases by ten knots or more, the feedback value via loop 58 is a ways a lower value than the calculated value of $y_d$. In this manner, the line 26 is generated. Likewise, the Max Select function ensures that the bank angle limit shall remain constant until the airspeed increases by more than ten knots. That is, in the event airspeed changes from a decreasing mode to an increasing mode, the calculated value $y_i$ will initially be less than the feedback value to the Max Select block 50. Therefore, the feedback value is output as the bank angle limit. However, when the airspeed has increased by ten knots or more, then $y_i$ is greater than the feedback value, and $y_i$ is output as the bank angle limit.

Figure 5:
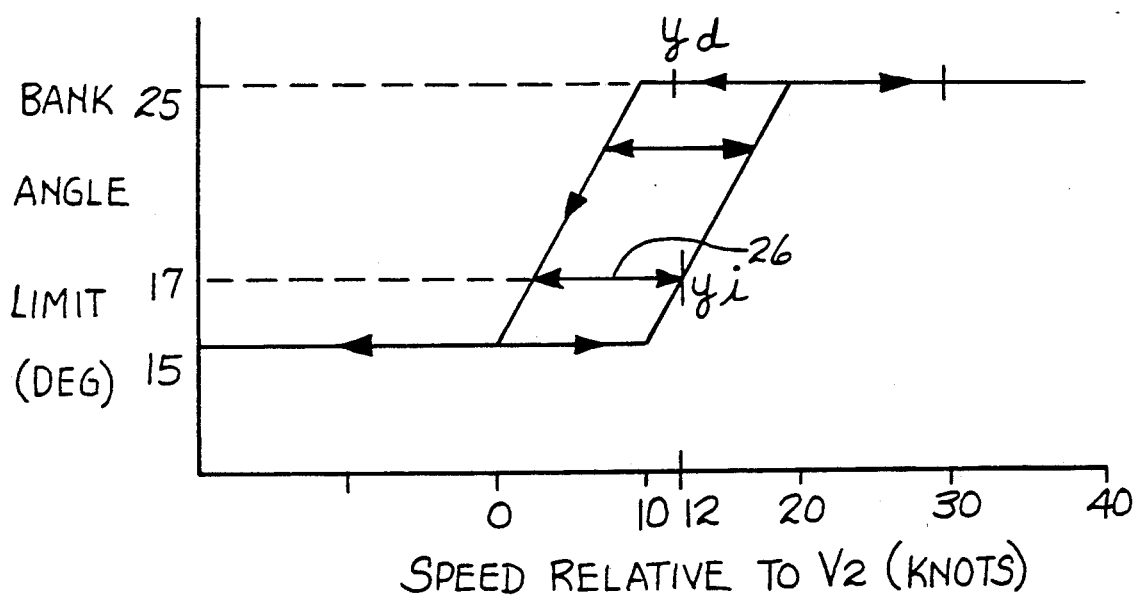
FIG. 5 is identical to the graph of FIG. 2 and illustrates an example wherein aircraft airspeed has been increasing to V2+12 and then begins to decrease.

For example, referring to FIG. 5, the aircraft airspeed has increased to V2+12 and therefore the bank angle limit is approximately seventeen degrees. Assume aircraft airspeed then starts decreasing. The calculated value of $y_d$lim to Min Select block 54 (FIG. 4B) is twenty five degrees as shown graphically in FIG. 5. The last bank angle limit value of seventeen degrees is fed back via loop 58 (FIG. 4B) to the Min Select block 54. However, since this feedback value is less than the $y_d$ value of twenty five degrees, the Min Select block 54 outputs the lower value of seventeen degrees as the bank angle limit value in order to generate line 26 (FIG. 5). Only when the calculated value of $y_d$lim is less than seventeen degrees (after a reduction in airspeed of at least ten knots), is this calculated value of $y_d$lim used to establish a new lower bank angle limit.

In the present embodiment a unique controller has been described for limiting aircraft bank angle. However, the present controller may be used to provide a limiting envelope for other aircraft flight parameters such as aircraft pitch attitude, airspeed and the like.

What is claimed is:

1. A method for controlling commanded operation of an aircraft, the method comprising the steps of:
   a. generating a command for controlling a flight parameter of the aircraft when the aircraft is operating between a first boundary value which is a function of a first airspeed and a second boundary value which is a function of a second airspeed;
   b. obtaining a value which is a function of the airspeed of the aircraft;
   c. calculating a limit to the command as a function of the obtained value such that when a change in magnitude of the obtained value changes from a first direction to a second direction which is opposite to the first direction, while the obtained value is within a range defined by the first boundary value and the second boundary value, the flight parameter limit remains constant until magnitude change of the obtained value in the second direction has exceeded a predetermined amount, whereupon the flight parameter limit changes;
   d. using the calculated flight parameter limit to limit the flight control command so that the aircraft does not exceed the flight parameter limit when the obtained value is between the first boundary and the second boundary; and
   e. operating aircraft flight controls in response to the limited flight control command.

2. The method as set forth in claim 1 wherein the first direction is an increasing direction and the second direction is a decreasing direction.

3. The method as set forth in claim 1 wherein the first direction is a decreasing direction and the second direction is an increasing direction.

4. A method for controlling commanded operation of an aircraft, the method comprising the steps of:
   a. generating a command for controlling a bank angle of the aircraft when the aircraft is operating between a first airspeed and a second airspeed;
   b. obtaining an airspeed of the aircraft;
   c. calculating a limit to the command as a function of the obtained airspeed such that when a change in the magnitude of the obtained airspeed changes between an increasing direction and a decreasing direction while the obtained airspeed is within a range defined by the first airspeed and the second airspeed, the bank angle limit remains constant until the change in the obtained airspeed has exceeded a predetermined amount whereupon the bank angle limit changes;
   d. using the calculated bank angle limit to limit the flight control command so that the aircraft does not exceed the bank angle limit when the obtained airspeed is between the first airspeed and the second airspeed; and
   e. operating aircraft flight controls in response to the limited flight control command.

5. A method for controlling commanded operation of an aircraft, the method comprising the steps of:
   a. generating a command for controlling a flight parameter of the aircraft when the aircraft is operating between a first boundary value which is a function of a first airspeed and a second boundary value which is a function of a second airspeed;
   b. obtaining a value which is a function of the airspeed of the aircraft;
   c. calculating a limit to the command as a function of the obtained value such that while the obtained value is within a range defined by the first boundary value and the second boundary value (i) the obtained value increases and then decreases, the flight parameter limit remains constant until the decrease in the obtained value has exceeded a predetermined amount whereupon the flight parameter limit changes, or (ii) the obtained value decreases and then increases, the flight parameter limit remains constant until the increase in the obtained value has exceeded a predetermined amount whereupon the flight parameter limit changes;
   d. using the calculated flight parameter limit to limit the flight control command so that the aircraft does not exceed the flight parameter limit when the obtained value is between the first boundary and the second boundary; and
   e. operating aircraft flight controls in response to the limited flight control command.

6. The method as set forth in claim 5 wherein:
   a. when the obtained value increases and then decreases, the flight parameter limit remains constant until the decrease in the obtained value has exceeded a predetermined amount whereupon the flight parameter limit decreases; and
   b. when the obtained value decreases and then increases, the flight parameter limit remains constant until the increase in magnitude of the obtained value has exceeded a predetermined amount whereupon the flight parameter limit increases.

7. The method as set forth in claim 6 wherein the flight parameter is an aircraft bank angle.

8. Apparatus for controlling commanded operation of an aircraft, the apparatus comprising:

a. means for generating a command for controlling a flight parameter of the aircraft when the aircraft is operating between a first boundary value which is a function of a first airspeed and a second boundary value which is a function of a second airspeed;

b. means for obtaining a value which is a function of the airspeed of the aircraft;

c. means for calculating a limit to the command as a function of the obtained value such that while the obtained value is within a range defined by the first boundary value and the second boundary value (i) the obtained value increases and then decreases, the flight parameter limit remains constant until the decrease in the obtained value has exceeded a predetermined amount whereupon the flight parameter limit changes, or (ii) the obtained value decreases and then increases, the flight parameter limit remains constant until the increase in the obtained value has exceeded a predetermined amount whereupon the flight parameter limit changes;

d. means for using the calculated flight parameter limit to limit the flight control command so that the aircraft does not exceed the flight parameter limit when the obtained value is between the first boundary and the second boundary; and e. means for operating aircraft flight controls in response to the limited flight control command.

9. The method as set forth in claim 1 wherein the calculating step includes the additional steps of:

a. determining when the airspeed of the aircraft is increasing and decreasing;

b. making a first calculation of flight parameter limit as a function of aircraft airspeed which is increasing;

c. making a second calculation of flight parameter limit as a function of aircraft airspeed which is decreasing; and d. using the first calculation as the flight parameter limit when the aircraft airspeed is increasing and the second calculation as the flight parameter limit when the aircraft airspeed is decreasing.

10. The method as set forth in claim 9 wherein the calculating step includes the additional steps of:

a. using the first calculation as the flight parameter limit when the aircraft airspeed is increasing;

b. using the second calculation as the flight parameter limit when the aircraft airspeed is decreasing;

c. using the first calculation as the flight parameter limit when the aircraft airspeed changes from an increasing direction to a decreasing direction until the aircraft airspeed changes by the predetermined amount whereupon the second calculation is used as the flight parameter limit.

11. The method as set forth in claim 4 wherein the calculating step includes the additional steps of:

a. determining when the airspeed of the aircraft is increasing and decreasing;

b. making a first calculation of bank angle limit as a function of aircraft airspeed which is increasing;

c. making a second calculation of bank angle limit as a function of aircraft airspeed which is decreasing; and d. using the first calculation as the bank angle limit when the aircraft airspeed is increasing and the second calculation as the bank angle limit when the aircraft airspeed is decreasing.

12. The method as set forth in claim 11 wherein the calculating step includes the additional steps of:

a. using the first calculation as the bank angle limit when the aircraft airspeed is increasing;

b. using the second calculation as the bank angle limit when the aircraft airspeed is decreasing;

c. using the first calculation as the bank angle limit when the aircraft airspeed changes from an increasing direction to a decreasing direction until the aircraft airspeed changes by the predetermined amount whereupon the second calculation is used as the bank angle limit.

13. The method as set forth in claim 12 wherein:

a. the first calculation is obtained from a first equation for a straight line having a first slope and a first y-intercept; and b. the second calculation is obtained from a second equation for a straight line having a second slope and a second y-intercept.

14. The method as set forth in claim 13 wherein:

a. the first slope is equal to the second slope; and b. the first y-intercept is separated from the second y-intercept by an amount equal to the predetermined amount.

15. The method as set forth in claim 14 wherein the step using the first calculation as the bank angle limit when the aircraft airspeed changes from an increasing direction to a decreasing direction includes the step of a. receiving the first calculation;

b. receiving the second calculation; and c. selecting the first calculation as the bank angle limit until the second calculation is less than the first calculation.

* * * * *